H. CLIFFORD.
SUSPENSION WHEEL.
APPLICATION FILED NOV. 22, 1910.
996,315.
Patented June 27, 1911.
2 SHEETS—SHEET 1.
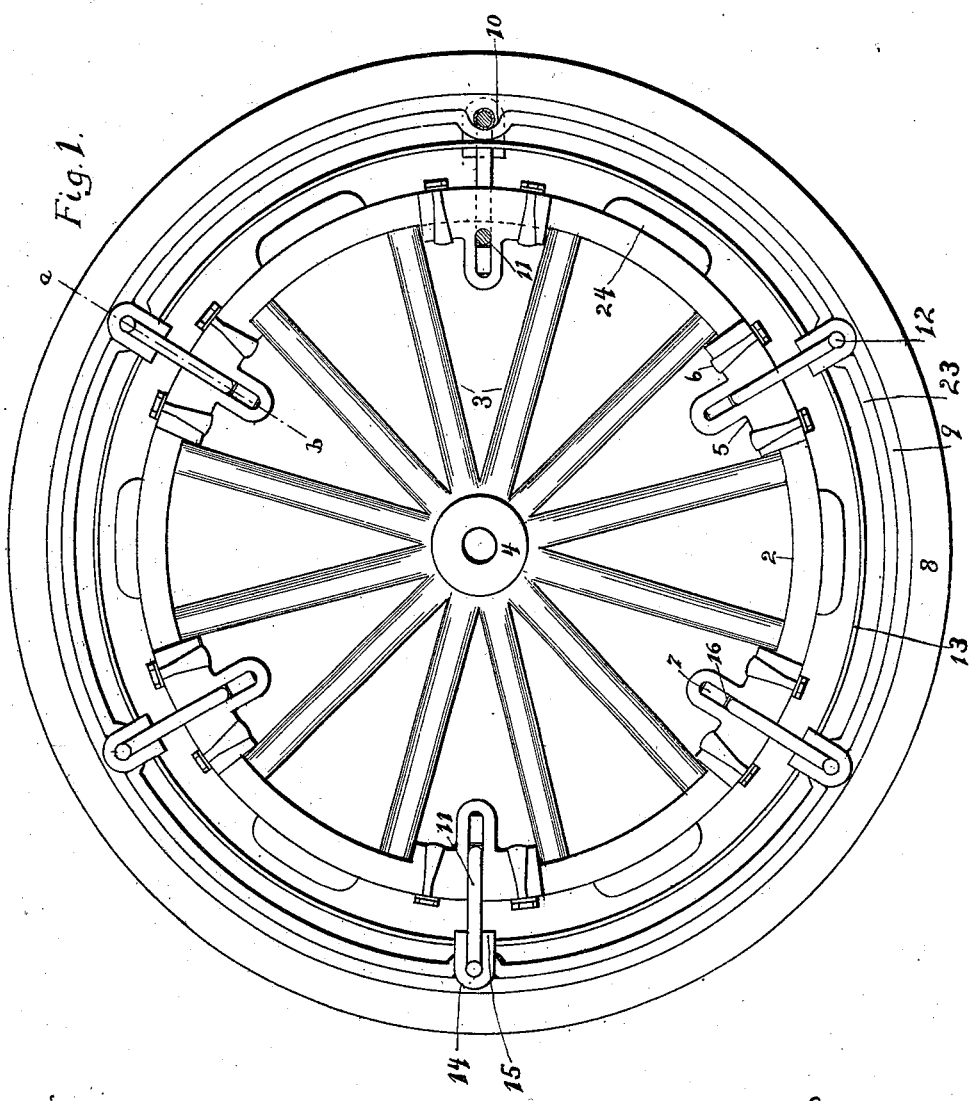

H. CLIFFORD.
SUSPENSION WHEEL.
APPLICATION FILED NOV. 22, 1910.
996,315.
Patented June 27, 1911.
2 SHEETS—SHEET 2.
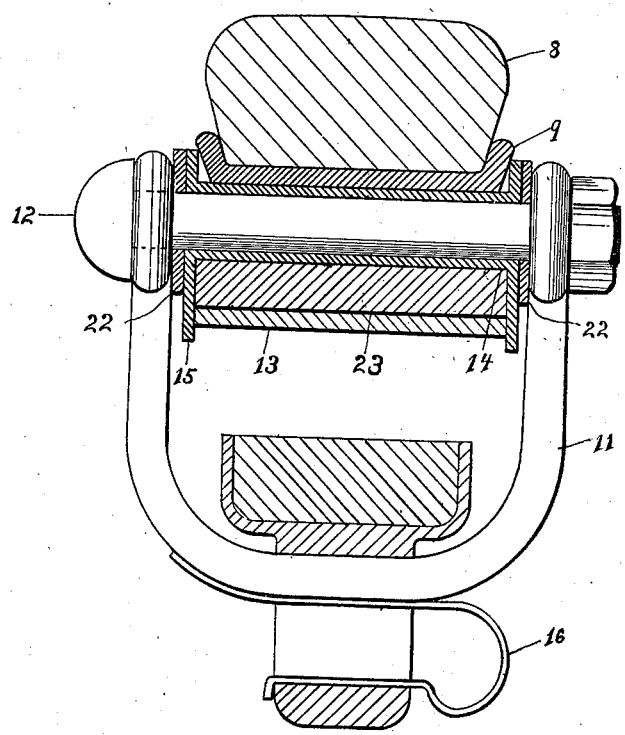
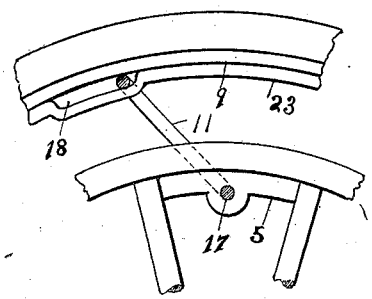
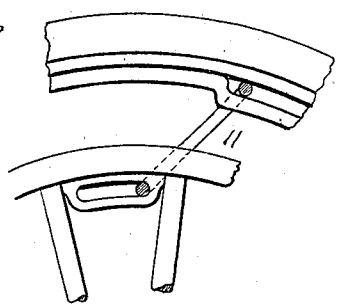
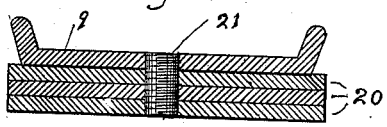
Witnesses
M. P. Nichols
C. L. Weed
Inventor
Herbert Clifford
by Seymour & Earle
Frederic C Earle
Attys

HERBERT CLIFFORD, OF NEW HAVEN, CONNECTICUT.

SUSPENSION-WHEEL.

996,315.  Specification of Letters Patent.  Patented June 27, 1911.

Application filed November 22, 1910. Serial No. 593,637.

*To all whom it may concern:*

Be it known that I, HERBERT CLIFFORD, a citizen of the United States, residing at New Haven, in the county of New Haven and State of Connecticut, have invented a new and useful Improvement in Suspension-Wheels; and I do hereby declare the following, when taken in connection with the accompanying drawings and the letters of reference marked thereon, to be a full, clear, and exact description of the same, and which said drawings constitute part of this specification, and represent, in—

Figure 1 a view in side elevation of a wheel partially in section constructed in accordance with my invention. Fig. 2 an enlarged sectional view on the line $a$—$b$ of Fig. 1. Fig. 3 a broken sectional view showing a modified form of connection between the felly and rim. Fig. 4 a similar view showing a further modification of connection between the felly and rim. Fig. 5 a broken view illustrating a modification in the manner of forming a bearing in the rim for the yoke. Fig. 6 a sectional view illustrating a modified form of rim.

This invention relates to an improvement in suspension wheels, and particularly to wheels for automobiles and similar vehicles, the object of the invention being to provide a wheel with a solid tire which will be sufficiently yielding to produce the same effect as a pneumatic tire, and the invention consists in the construction hereinafter described and particularly recited in the claims.

In carrying out my invention I employ a felly 2 supported by spokes 3 from a hub 4 in the usual manner of wheels. At various points on the felly, and herein shown at six equi-distant points, I attach blocks 5 by clips 6 and these blocks are formed with radial slots 7. The rubber tire 8 is secured to a rim 9, preferably of the channel type, and this rim is secured to a rim-band 23 which is formed at equi-distant points with bends 10. Through the slots 7, yokes 11 are passed and the ends of these yokes are connected by bolts 12 which pass through the bends 10 in the rim-band, and the rim-band and felly are so proportioned and arranged that in the normal condition the yokes will have a bearing at the outer ends of the slots 7. Preferably I arrange an inner reinforcing band 13 which bears upon the inner surfaces of the bends 10, and I also provide a bushing 14 for the bolts 12, which bushing will have inwardly projecting flanges 15 to hold the band 13 in place. To prevent rattling, C-springs 16 will be inserted through the slots 7.

Instead of providing the blocks 5 with radial slots 7 and the rim-band 23 with short bends 10, the blocks 5 may be formed with round holes 17 for the passage of the yokes 11 and the rim-band 23 formed with long bends to provide circumferential slots 18 for the outer ends of the yokes to ride in, as shown in Fig. 3 of the drawing; or if desired, both the blocks and the rim-band may be provided with slots as shown in Fig. 4 of the drawings; and instead of forming the slot by bending the bands, staples 19 may be attached to the rim-band as indicated in Fig. 5 of the drawings; and while the band may be formed from a single thickness of metal, in many cases it may be desired to form it from a series of thin strips 20 as shown in Fig. 6 of the drawings; and if so formed, or in either case, the rim 9 may be secured to the band by a headless screw 21. If required, and to prevent wear, washers 22 may be inserted between the ends of the bushing 14 and the ends of the yokes. When more than the normal load is applied the lowermost yokes will move inwardly in their bearings so as to allow the band and rim to flatten accordingly, while the upper portions of the band, rim and felly will be amply supported by their respective yokes. If desired, blocks 24 of rubber may be secured to the felly alternately with the blocks 5 to limit the yielding of the rim-band. I thus provide a suspension wheel with a resilient rim which, while exceedingly strong, is sufficiently yielding to have the effect of a pneumatic tire, and the use of shock absorbers between the axles and body of a vehicle will not be necessary.

I claim:—

1. A suspension wheel comprising a felly, hub and spokes, blocks secured at equi-distant points to said felly between the spokes, said blocks formed with radial slots, a rim-band formed with bends corresponding in number to the number of blocks, a tire carried by the rim-band, and yokes engaging with the said blocks and connected with said band at said bends.

2. A suspension wheel comprising a felly, hub and spokes, blocks secured at equi-distant points to the said felly, a rim-band formed with bends in line with said blocks, a tire carried by said rim-band, yokes engaging with said blocks and connected with said band at said bends, and a reinforce band between said felly and rim and bearing on the bends of the said rim-band.

3. A suspension wheel comprising a felly, hub and spokes, blocks secured at equi-distant points to said felly, said blocks formed with radial slots, a rim-band, a tire carried thereby, yokes engaging with said blocks and connected with said rim-band, and C-springs inserted into said slots and bearing on said yokes.

4. A suspension wheel comprising a felly, hub and spokes, blocks secured to said felly, a rim-band, a tire carried thereby, yokes connecting the felly and rim-band, a reinforcing band between the felly and rim-band bearing on said rim-band, a bolt connecting the ends of the yoke through said rim-band, a bushing around said bolt and formed with outwardly projecting flanges extending beyond the edges of said reinforcing-band.

In testimony whereof, I have signed this specification in the presence of two subscribing witnesses.

HERBERT CLIFFORD.

Witnesses:
FREDERIC C. EARLE,
CLARA L. WEED.